US008917934B2

(12) United States Patent
Datta et al.

(10) Patent No.: US 8,917,934 B2
(45) Date of Patent: Dec. 23, 2014

(54) MULTI-CUE OBJECT DETECTION AND ANALYSIS

(75) Inventors: Ankur Datta, White Plains, NY (US); Rogerio S. Feris, White Plains, NY (US); Sharathchandra U. Pankanti, Darien, CT (US); Xiaoyu Wang, Columbia, MO (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/523,074

(22) Filed: Jun. 14, 2012

(65) Prior Publication Data

US 2013/0336581 A1   Dec. 19, 2013

(51) Int. Cl.
*G06K 9/00* (2006.01)
*G06K 9/34* (2006.01)
*H04N 1/40* (2006.01)
*H04N 1/46* (2006.01)

(52) U.S. Cl.
USPC ........... 382/173; 382/164; 382/180; 358/464; 358/538

(58) Field of Classification Search
CPC ........................ G06K 9/00536; G06T 7/0083
USPC ................. 382/164, 180, 224, 165, 171, 173; 358/453, 464, 538
See application file for complete search history.

(56) References Cited

U.S. PATENT DOCUMENTS

| | | | | |
|---|---|---|---|---|
| 5,268,967 A * | 12/1993 | Jang et al. | ...................... | 382/132 |
| 8,126,283 B1 * | 2/2012 | Garbacea et al. | ............. | 382/243 |
| 2002/0146166 A1 * | 10/2002 | Rao et al. | ...................... | 382/164 |
| 2002/0181785 A1 * | 12/2002 | Gutta et al. | ................... | 382/225 |
| 2003/0031366 A1 * | 2/2003 | Li et al. | .......................... | 382/206 |
| 2003/0072487 A1 * | 4/2003 | Fan et al. | ...................... | 382/176 |
| 2003/0195883 A1 * | 10/2003 | Mojsilovic et al. | ............... | 707/6 |
| 2005/0244072 A1 * | 11/2005 | Imai | ............................... | 382/254 |
| 2006/0062456 A1 * | 3/2006 | Chiu et al. | .................... | 382/173 |
| 2007/0014460 A1 * | 1/2007 | Kuziela et al. | ................ | 382/128 |

(Continued)

FOREIGN PATENT DOCUMENTS

| | | |
|---|---|---|
| CN | 101699512 A | 4/2010 |
| CN | 101944267 A | 1/2011 |
| CN | 102270343 A | 12/2011 |
| WO | WO2011122333 A1 | 10/2011 |

OTHER PUBLICATIONS

State Intellectual Property Office, The P.R. China, International Search Report and Written Opinion issued Nov. 7, 2013 re PCT Application of International Business Machines Corporation, No. PCT/IB2013/054505.

*Primary Examiner* — Yubin Hung

(74) *Attorney, Agent, or Firm* — Patrick J. Daugherty; Driggs, Hogg, Daugherty & Del Zoppo Co., LPA

(57) ABSTRACT

Foreground objects of interest are distinguished from a background model by dividing a region of interest of a video data image into a grid array of individual cells that are each smaller than that a foreground object of interest. More particularly, image data of the foreground object of interest spans a contiguous plurality of the cells. Each of the cells are labeled as foreground if accumulated edge energy within the cell meets an edge energy threshold, if color intensities for different colors within each cell differ by a color intensity differential threshold, or as a function of combinations of said determinations in view of one or more combination rules.

25 Claims, 5 Drawing Sheets

(56) References Cited

U.S. PATENT DOCUMENTS

| | | | |
|---|---|---|---|
| 2007/0269105 A1* | 11/2007 | Zhang et al. | 382/165 |
| 2009/0244309 A1* | 10/2009 | Maison et al. | 348/222.1 |
| 2010/0046831 A1* | 2/2010 | Kang | 382/166 |
| 2010/0142807 A1* | 6/2010 | Yasuda et al. | 382/164 |
| 2010/0322516 A1 | 12/2010 | Xu | |
| 2011/0170744 A1 | 7/2011 | Malinovskiy et al. | |
| 2011/0293141 A1 | 12/2011 | Robert et al. | |
| 2012/0027248 A1 | 2/2012 | Feris et al. | |
| 2012/0106837 A1* | 5/2012 | Partis et al. | 382/165 |
| 2013/0259374 A1* | 10/2013 | He et al. | 382/173 |

* cited by examiner

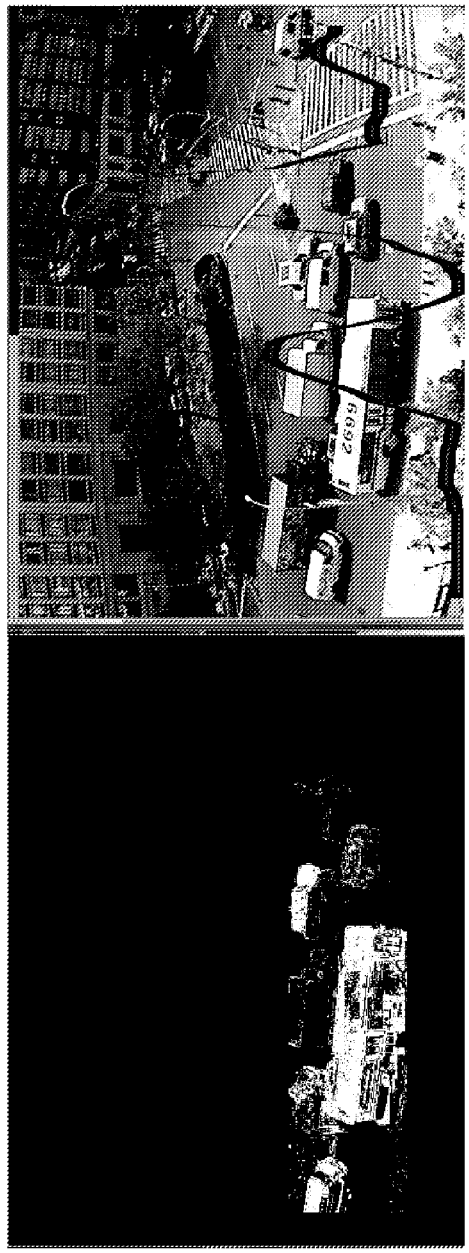
FIG 1B
FIG 1A
FIG 2B
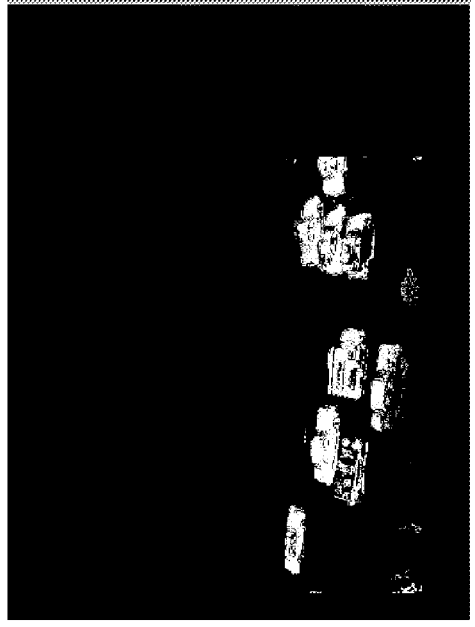
FIG 2A

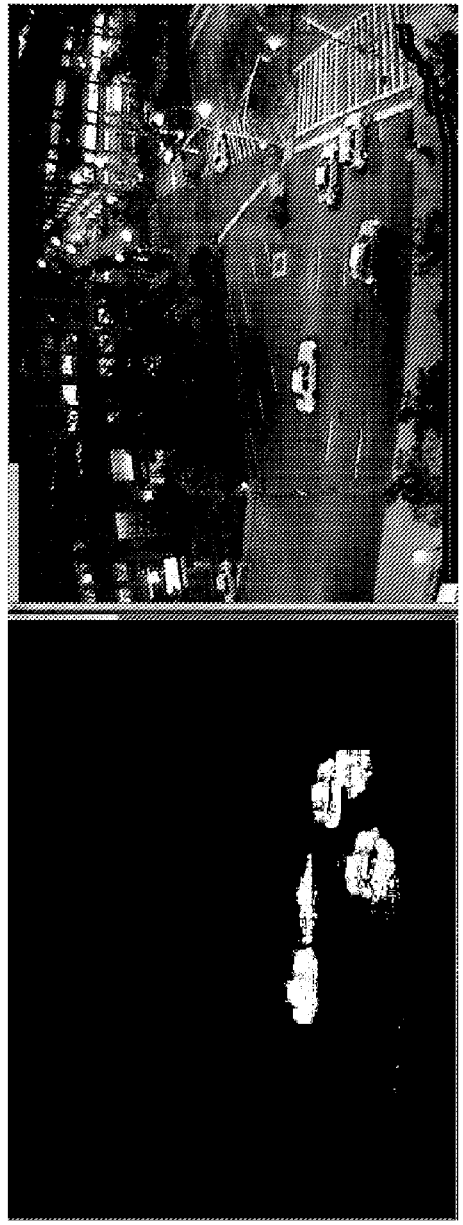
FIG 3B
FIG 3A
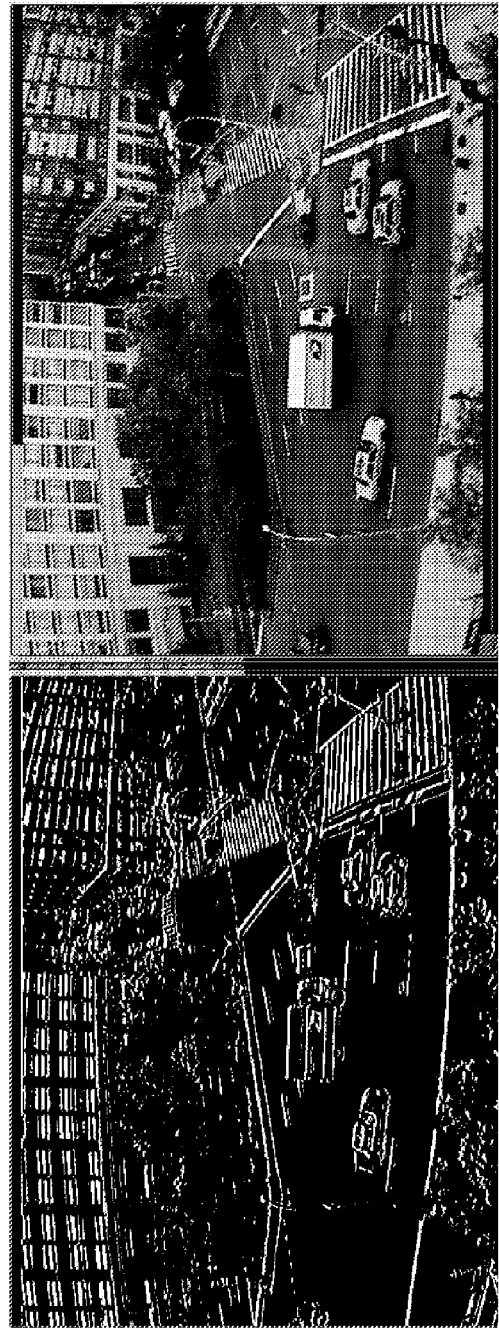
FIG 6B
FIG 6A

MULTI-CUE OBJECT DETECTION AND ANALYSIS

FIELD OF THE INVENTION

Embodiments of the present invention relate to automated object detection and differentiation through analysis of video image data of a scene that comprises object images.

BACKGROUND

Automated systems are known that use background subtraction (BGS) methods to distinguish foreground objects from a determined image background as a function of analysis results from motion inference algorithms. In some examples, adaptive background modeling is used to detect foreground masks obtained with respect to a BGS model. BGS systems may also use adaptive mixtures of Gaussian models to detect non-static objects as moving foreground objects distinct from other objects or scene image data within the background model of the image scene.

Accurately distinguishing between static and non-static objects in prior art BGS systems is problematic. Non-static objects that remain motionless for a given period of time may be erroneously treated as static objects and learned into a background scene model. Healing problems may arise when formerly stationary objects begin to move, wherein the objects remain in the foreground as "ghosts" after they have in fact moved on and out of the image scene. Noisy light and shadow data within the analyzed video image may present still further problems in object detection and tracking, wherein current frame image data may change suddenly due to quickly changing lighting conditions and thereby cause false moving object detection events.

BRIEF SUMMARY

In one embodiment of the present invention, a method for distinguishing foreground objects of interest from a background model includes dividing by a programmable device a region of interest of a video data image into a grid array of a plurality of individual cells that are each initialized with a background label, wherein each of the cells has a two-dimensional area dimension that is smaller than a two-dimensional area size of a foreground object of interest so that image data of the foreground object in an image data frame spans a contiguous plurality of the cells. The programmable device acquires frame image data for each of the cells and thereby detects and accumulates energy of edges within each of the cells, and re-labels as foreground each of the cells that have an accumulated edge energy that meets an edge energy threshold and are currently labeled as background. The programmable device also determines color intensities for each of a plurality of different colors within each cell, and re-labels said cells as foreground if one color intensity is greater than another for that cell by a color intensity differential threshold, if the cell is currently labeled as background. Accordingly, the programmable device uses the frame image data from the cells relabeled as foreground to define a foreground object.

In another embodiment, a method for distinguishing foreground objects of interest from a background model includes a programmable device dividing a region of interest of a video data image into a grid array of a plurality of individual cells, wherein each of the cells has a two-dimensional area dimension that is smaller than a two-dimensional area size of a foreground object of interest so that image data of the foreground object in an image data frame spans a contiguous plurality of the cells. The programmable device acquires frame image data for each of the cells and detects and accumulates energy of edges within each of the cells, thereby generating an edge energy foreground indication output for each of the cells that indicates foreground if an accumulated edge energy meets an edge energy threshold, or indicates background if the accumulated edge energy does not meet the edge energy threshold. The programmable device further determines color intensities for each of a plurality of different colors within each of the cells, and generates a color intensity foreground indication output for each of the cells that indicates foreground if one of the determined color intensities is greater than another of the determined color intensities for that cell by a color intensity differential threshold, or indicates background if no one of the determined color intensities is greater than any other one of the determined color intensities for that cell by the color intensity differential threshold. The programmable device accordingly labels each of the cells as foreground or background in response to the color intensity foreground indication output and the color intensity foreground indication output for the each cell as a function of a foreground indication output combination rule, uses the frame image data from the cells labeled as foreground cells to define a foreground object.

In another embodiment, a system has a processing unit, computer readable memory and a tangible computer-readable storage medium with program instructions, wherein the processing unit, when executing the stored program instructions, divides a region of interest of a video data image into a grid array of a plurality of individual cells that are each initialized with a background label, wherein each of the cells has a two-dimensional area dimension that is smaller than a two-dimensional area size of a foreground object of interest so that image data of the foreground object in an image data frame spans a contiguous plurality of the cells. The programmable device acquires frame image data for each of the cells and thereby detects and accumulates energy of edges within each of the cells, and re-labels as foreground each of the cells that have an accumulated edge energy that meets an edge energy threshold and are currently labeled as background. The programmable device also determines color intensities for each of a plurality of different colors within each cell, and re-labels said cells as foreground if any one color intensity is greater than another for that cell by a color intensity differential threshold, if the cell is currently labeled as background. Accordingly, the programmable device uses the frame image data from the cells relabeled as foreground to define a foreground object.

In another embodiment, an article of manufacture has a tangible computer-readable storage device with computer readable program code embodied therewith, the computer readable program code comprising instructions that, when executed by a computer processing unit, cause the computer processing unit to divide a region of interest of a video data image into a grid array of a plurality of individual cells, wherein each of the cells has a two-dimensional area dimension that is smaller than a two-dimensional area size of a foreground object of interest so that image data of the foreground object in an image data frame spans a contiguous plurality of the cells. The programmable device acquires frame image data for each of the cells and detects and accumulates energy of edges within each of the cells, thereby generating an edge energy foreground indication output for each of the cells that indicates foreground if an accumulated edge energy meets an edge energy threshold, or indicates background if the accumulated edge energy does not meet the edge energy threshold. The programmable device further determines color intensities for each of a plurality of different colors within each of the cells, and generates a color intensity foreground indication output for each of the cells that indicates foreground if one of the determined color intensities is greater than another of the determined color intensities for that cell by a color intensity differential threshold, or indicates background if no one of the determined color intensities is greater than any other one of the determined color intensities for that cell by the color intensity differential threshold. The programmable device accordingly labels each of the cells as foreground or background in response to the color intensity foreground indication output and the color intensity foreground indication output for the each cell as a function of a foreground indication output combination rule, uses the frame image data from the cells labeled as foreground cells to define a foreground object.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 1A is a graphic illustration of a background model learned from the scene of FIG. 1B, wherein FIG. 1B is a photographic rendering of the scene in common with FIG. 1A.

FIG. 2A is a graphic illustration of a foreground model learned from the scene of FIG. 2B, wherein FIG. 2B is a photographic rendering of the scene in common with FIG. 2A.

FIG. 3A is a graphic illustration of a foreground model learned from a video data frame photographically depicted in FIG. 3B.

FIG. 6A is a graphic illustration of examples of rich edges determined from image data photographically illustrated in FIG. 6B.

Figure 4:
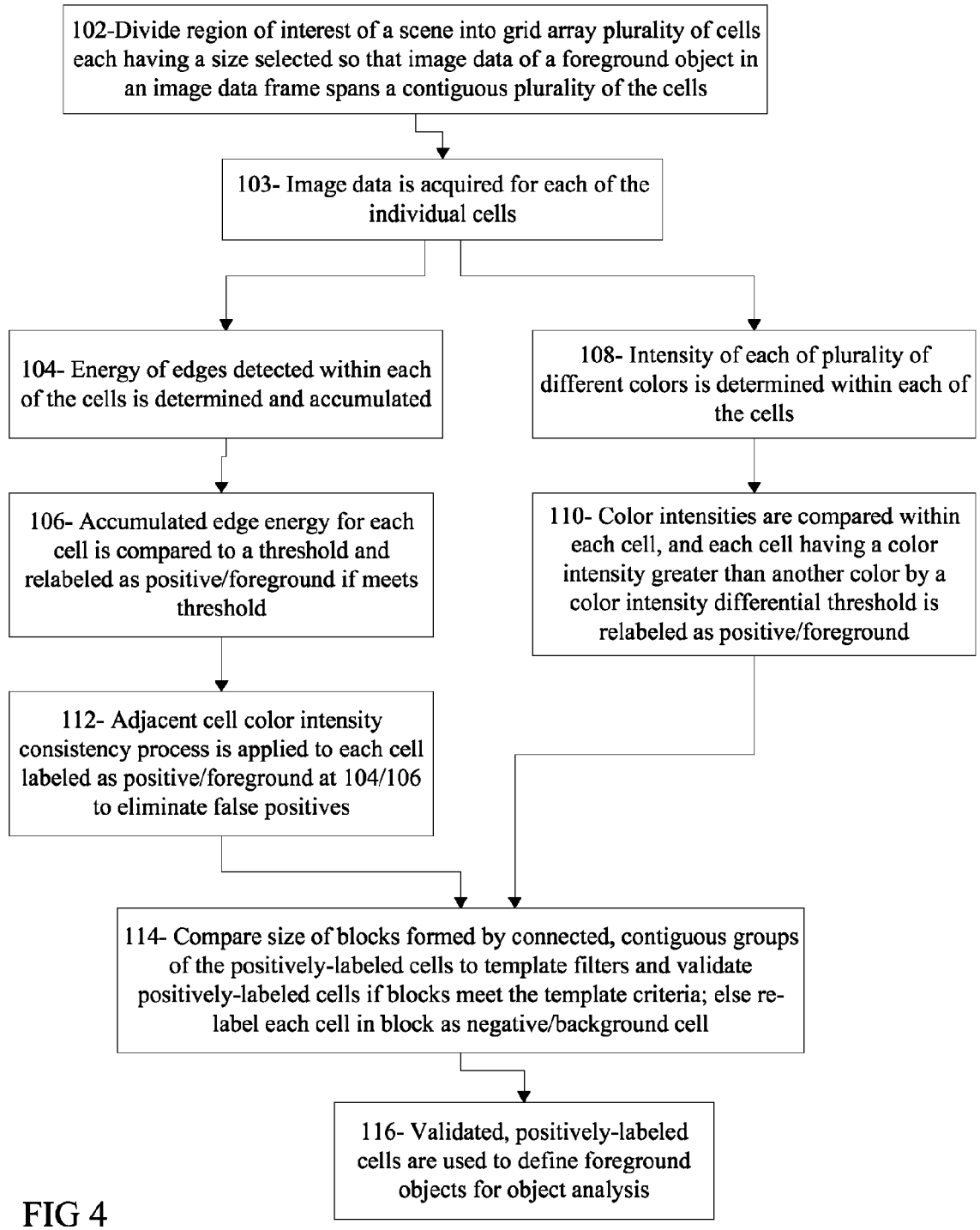
FIG. 4 is a block diagram illustration of an embodiment of a method, process or system according to the present invention for distinguishing and analyzing foreground objects of interest from a background model.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The performance of automated systems for vehicle object detection and differentiation that analyze video image data of roadways may be compromised by traffic congestion. Some prior art automated systems may use background subtraction (BGS) methods in a straightforward approach that takes advantage of analysis results from motion inference algorithms. Adaptive background modeling, found useful in crowd analysis in detecting crowding by counting the foreground masks obtained with respect to a BGS model, may also be useful in traffic applications that experience vehicle object congestion.

BGS systems that use adaptive mixtures of Gaussian models also demonstrate excellent performance in detecting vehicles as moving foreground objects distinct from other objects or scene image data that represent static image data within the background model of the image scene. However, in traffic congestion conditions (for example, heavy vehicle loading on a roadway within the image caused by rush hour traffic), vehicles may stop and stay static for relatively long times, longer than the system may generally anticipate for otherwise moving vehicle objects traversing a roadway. In such cases, adaptive BGS systems may gradually learn static vehicle objects into a background scene model, and thereby fail to detect or identify the static vehicle as a vehicle. For example, FIG. 1A shows a background model learned from the scene of FIG. 1B, wherein some vehicles have been gradually learned into background after a long period of remaining stationary, causing foreground detection related traffic analysis methods to fail in this system with respect to said vehicles 102. This is particularly problematic when the system is used to detect static roadway congestion conditions, which is a common application for traffic analysis systems.

FIGS. 2A and 2B illustrate another problem with adaptive BGS foreground detection: a healing problem that arises when stationary objects begin to move. The left image 2A is a foreground image obtained from a BGS model, wherein vehicle objects remain in the foreground image after moving away, and may be referred to as "ghosts." The right image 2B is the original video frame, showing a current frame wherein the vehicles have moved away after a temporary static, motionless period that resulted in the creation of the ghosts in the foreground model in FIG. 2A.

A lower learning rate may be used to prevent temporarily static objects from being learned into background as reflected by vehicles of FIG. 1A, while a higher learning rate may be used to avoid the healing problems indicated by the ghosts of FIG. 2A. Therefore, some prior adaptive BGS models tune the learning rate to obtain a trade-off to cure one of the learning or healing problems, as a function of observing and determining static periods for moving objects to be detected. However, such trade-offs generally result in increased errors with respect to the non-favored one of the learning or healing problems. Moreover, in heavy traffic conditions, it may not be possible to determine a period of time that each vehicle will stay static, and this unpredictable characteristic creates difficulties in effectively employing adaptive BGS models within automated traffic congestion analysis systems.

FIGS. 3A and 3B illustrate another problem in vehicle detection and tracking: noisy light and shadow data within the video image analyzed. The left image 3A is a foreground image obtained from a BGS model, wherein the right image 3B is the original video frame. Noisy light image data is created by vehicle headlights during nighttime images, and fast-moving clouds may also yield false foreground data from vehicle shadows in daylight conditions. As prior art BGS models generally identify moving (non-static) objects from differences between the current video frame data and the background model, when the current frame image data changes suddenly due to quickly changing lighting conditions, these different lighting conditions often result in false moving object detection. For example, a suddenly appearing, transient shadow caused by a moving cloud admitting sunlight upon a vehicle is not itself an object, moving or otherwise, yet the prior art BGS model will likely falsely identify it as a moving object.

Some prior art approaches use predetermined object detectors for specific objects of interest, for example via Adaboost and edge vector methods that train a vehicle detector for congestion prediction. However, such learning-based object detectors are hard to create and apply in real-time traffic congestion applications. Moreover, such learned object detectors present deformation, occlusion and multiple view problems. For example, vehicles have large intra-class variation: automobile sedans, convertibles, motorcycles, trucks, and vans all have very different size and geometric image attributes. Therefore, no single object detector model may be expected to perform acceptably with respect to real-world traffic congestion applications. Furthermore, a learned detector model may have fitting problems if trained in one dataset and tested in a different dataset, and such methods must be supervised or semi-supervised to make the system work adequately.

FIG. 4 illustrates an embodiment of a method or system for distinguishing and analyzing foreground vehicle objects of interest from a background model, in the present example of a roadway scene in video image data. At 102 a region of interest of a roadway scene that may comprise vehicles in the video image data is divided into a plurality of individual cells, and at 103 image data is acquired from and for each of the individual cells of the region of interest. More particularly, each of the cells has a two-dimensional area size that is smaller than a two-dimensional area size of a foreground object of interest. Each of the cells is also initialized with a default background label: in the present example, they are initialized with a "zero" or negative value label signifying background, wherein a "one" or positive-value label instead signifies a foreground object (i.e. the cell data is part of a vehicle object). (In other examples, they may be initialized instead with foreground object labels.)

Figure 5:
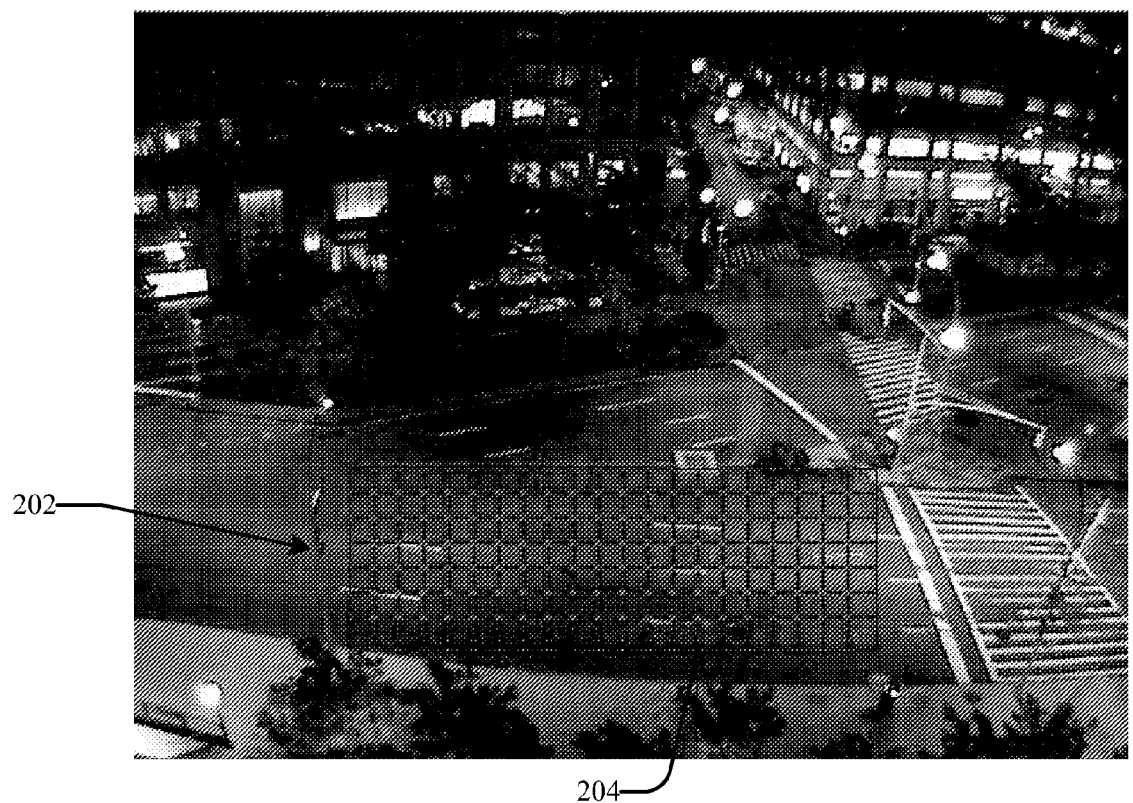
FIG. 5 is a graphic illustration of video image data depicting a region of interest divided into a grid or array of the cells used to distinguish and analyze foreground objects of interest from a background model according to the present invention.

FIG. 5 illustrates one example of a region of interest 202 spanning the width of a roadway that carries vehicular traffic such as cars, trucks, motorcycles, taxiing airplanes, etc. The region of interest 202 is divided into a grid or array of the small cells 204 that have a size selected so that foreground vehicles of interest span at least four of the cells 204 in a contiguous two-by-two grouping (two cells high by two cells wide). In the present embodiment configured to detect vehicle object traffic, the cells 204 are 16-by-16 pixel square cells selected to correlate with the image resolution, the size of vehicles within the scene at the current, fixed field of view (fixed zoom setting) and anticipated intensity of traffic in the scene. However, a variety of other cell sizes may be practiced (for example 8-by-8 pixels square, 32-by-32, etc.), and the present examples are illustrative but not exhaustive examples of embodiments of the present invention. Embodiments may also be practiced with image data from other region-of-interest areas that experience vehicular traffic from the movement of vehicle objects, such as parking lots, driveways and on-ramps, etc., and still other embodiments may be practiced with respect to other types of moving objects (for example, people, animals, insects, etc.), and relative to a wide variety of scene contexts through which such objects may traverse (sidewalks, mass transit platforms, woodland paths, etc.).

The present embodiment employs a multiple-cue (MCUE) analysis of the cell data. Instead of merely taking the difference between frames and a background model in a BGS framework as taught by the prior art, the present embodiment analyzes each frame independently to determine image pixel intensity, edge, color and cell context information. This information may be considered and combined to generate multiple cues for robust moving object detection. Systems generating each cue may run in a real-time fashion, and may independently (or in combinations with other cue determinations) determine foreground labels for the cells.

Object Detection from Edge Cues.

At 104 the energy of edges detected within each of the cells is determined and accumulated (combined), and at 106 the accumulated edge energy for each cell is compared to an edge energy threshold to determine whether each cell is part of a vehicle or not. More particularly, if the accumulated edge energy in a cell meets the edge energy threshold, then the cell is labeled at 106 as "one" (or positive) signifying it is foreground (part of a vehicle object); otherwise it is labeled at 106 as "zero" (or negative), signifying it is background.

Object traffic will generally create edges in image data within a region of interest. FIG. 6A shows examples of rich edges determined from image data illustrated in FIG. 6B that are useful to detect vehicle objects on a roadway. In one embodiment, the edge energy analysis at 104/106 comprises applying a Sobel operator to each cell to create an edge patch, wherein the binary label of the cell is determined by formulation [1]:

$$f_e(c_m) = \begin{cases} 1 & \sum_{i=1}^{N} E(x_i) > t_e \\ 0 & \sum_{i=1}^{N} E(x_i) \le t_e \end{cases} \quad [1]$$

wherein $c_m$ is the $m^{th}$ cell, and $E(x_i)$ is the energy of the edge at pixel x, of an plurality of pixels "i" of the cell $c_m$. If the summation of edge energy in the cell is bigger than the edge energy threshold $t_e$, it is relabeled (or labeled) as "one" and thus a part of a foreground vehicular object traffic; otherwise it remains labeled (or is labeled or re-labeled) "zero" as part of the background (road, driveway, etc.). Other embodiment may use a different edge detection algorithm, for example, Canny or Prewitt, and still others will be apparent to one skilled in the art.

Determination of the edge energy $E(x_i)$ at 106 may also be a complex functional combination of multiple different edge detection processes, wherein multiple different edge detection processes may be used at 104 (and in some applications, differently weighted) as appropriate to the requirements of a scene and its objects of interest. For example, a positive/foreground label or voting for a label at 106 may be assigned if any of a plurality of different processes 104 makes a foreground determination, putting all of a plurality of 104 outputs into a logical OR that any positive label determination input 104 results in a positive label or vote output. Alternatively, more than one of a plurality of different processes 104 may be required to make an output, wherein the foreground label determination at 106 may be a voting tabulation wherein a threshold number of votes is required (for example, two) to confirm a label; or wherein all of a plurality of processes 104 must output the same determination into a logical AND decision process to result in a corresponding label at 106.

Object Detection from Color Cues.

In a process parallel to (or otherwise separate from) the edge energy process 104/106, at 108 intensity of each of a plurality of different colors is determined within each of the cells. The color intensities determined for the different colors are compared within each cell at 110, and if the comparison indicates the presence of a color object (one or more colors have more intensity greater than one or more others of the colors by a color intensity differential threshold), then the cell is labeled or relabeled as "one" or "positive" signifying foreground. Otherwise, if the comparison indicates substantially grey/monochrome image information indicative of background, then the cell is labeled or relabeled as "zero" or "negative," signifying background.

Color context object detection according to the present invention takes advantage of the fact that the background road and lanes are generally, substantially gray or otherwise monochrome. In one embodiment, color cue analysis at 108/110 explores red-relative green-blue (RGB) intensity differences between each of the cells 204. If differences in the relative intensities of the three RGB color channels suggest that the object contained in a cell 204 is a pure color object, and not substantially grey/monochrome, then the object is labeled as "one" or "positive" signifying that it is part of a foreground vehicle object.

In one embodiment of the present invention, intensity differences between channels are accumulated to verify whether it is a colorful cell or not as a function of formulation [2]:

$$f_c(c_m) = \begin{cases} 0 & \frac{\min(D_{rg}, D_{rb}, D_{gb})}{\max(D_{rg}, D_{rb}, D_{gb})} > t_c \\ 1 & \frac{\min(D_{rg}, D_{rb}, D_{gb})}{\max(D_{rg}, D_{rb}, D_{gb})} \le t_c \end{cases} \quad [2]$$

wherein the subscripts indicate the intensity difference between sets of two of the color channels: for example, ($D_{rg} = \sum_{i=1}^{N} |d_{rg,i}|$), $d_{rg,i}$ signifies the intensity difference between the red channel ("r") and the green channel ("g") for each pixel "i" of "N" pixels of the cell $c_m$, $D_{rb}$ is determined as equal to "$\sum_{i=1}^{N} |d_{rb,i}|$", $d_{rb,i}$ is an intensity difference between the red channel and the blue channel for each of the "N" pixels "i" of the cell $c_m$, $D_{gb}$ is determined as equal to "$\Sigma^N_{i=1}|d_{gb,i}|$", $d_{gb,i}$ is an intensity difference between the relative green channel and the blue channel for each of the "N" pixels "i" of the cell $c_m$, and $f_c(c_m)$ is the color intensity differential of $c_m$, the $m^{th}$ cell. Formulation [2] suggests the cell to be a foreground object if the intensity of one of the color channels is significantly different from the other two. Unlike a given intensity value, the absolute difference determined between color intensities within a cell is generally more robust to illumination change. The information extracted by Formulation [2] is very effective at detecting generally colorful vehicles, such as red cars or yellow taxis. The color intensity differential threshold ($t_c$) may be set to an operating point wherein the system has a high precision, either by a user or automatically through feedback processes and comparisons of generated results to training video inputs with known values, as will be appreciated by one skilled in the art.

In other embodiments, determining color intensity differentials at 110 comprises building color histograms for cells and computing distances between them using appropriate metrics, for example Bhattacharya processes; still other appropriate color intensity determinations will be apparent to one skilled in the art. The color intensity differential determination at 110 may also be a complex functional combination of the outputs of multiple processes 108, wherein multiple different color intensity differential processes may be used at 108 (and in some applications, differently weighted) as appropriate to the requirements of a scene and its objects of interest. For example, a positive/foreground label or voting for a label at 110 may be assigned if any of a plurality of different processes 108 makes a foreground determination, putting all of a plurality of 108 outputs into a logical OR that any positive label determination input 108 results in a positive label or vote output. Alternatively, more than one of a plurality of different processes 108 may be required to make an output, wherein the foreground label determination at 110 may be a voting tabulation wherein a threshold number of votes is required (for example, two) to confirm a label; or wherein all of a plurality of processes 108 must output the same determination into a logical AND decision process to result in a corresponding label at 110.

False Alarm Elimination from Cell Context.

Embodiments of the present invention also reduce false positives in cell 204 labels by considering their context with respective to adjacent cell values. In the present example, two contexts may be considered: adjacent cell color intensity consistency and object block context.

Adjacent Cell Color Intensity Consistency.

The accuracy of the positive object determinations/labels made for cell 204 data as a function of edge energies determined within the cells 204 at 104/106 as described above may be compromised by image data challenges. For example, noise created by background features discernible within the cells (such as roadway lane markings, curbs, etc.) may create false-positive cell labels to be applied to background cells. Also, relatively big vehicles (trucks, buses, etc.) may have big flat regions wherein edges are not discernible within some of the cells, leading to erroneous miss-detection of some of these cells as background elements and erroneous negative/zero labeling.

Accordingly, at 112 an adjacent cell color intensity consistency process is applied to each of the cells labeled as foreground (positive or one) by the edge energy process at 104/106 to eliminate false positives created by noisy edges. In one embodiment of the present invention, the different individual color intensities determined independently within each positively-labeled cell (for example, by the color determination process at 108) are summed and compared to the color intensity sums of adjacent, neighborhood cells. In one example, the context adjacent cell color intensity consistency information may be quantified and computed according to Formulation [3]:

$$f_{c1}(c_m) = \begin{cases} 0 & \frac{\min(\|v_{rgb}\|, \{\|v'^1_{rgb}\| \ldots \|v'^K_{rgb}\|\})}{\max(\|v_{rgb}\|, \{\|v'^1_{rgb}\| \ldots \|v'^K_{rgb}\|\})} > t_{c1} \\ 1 & \frac{\min(\|v_{rgb}\|, \{\|v'^1_{rgb}\| \ldots \|v'^K_{rgb}\|\})}{\max(\|v_{rgb}\|, \{\|v'^1_{rgb}\| \ldots \|v'^K_{rgb}\|\})} \leq t_{c1} \end{cases} \quad [3]$$

where $V_{rgb}=(\upsilon_1, \upsilon_2, \upsilon_3)'$ is the summation of intensity values for each of the individual RGB channels, and $\{\|V'^1_{rgb}\| \ldots V'^K_{rgb}\|\}$ is related to the set of "K" adjacent cells, $f_{c1}(c_m)$ adjacent cell color intensity of, the $m^{th}$ cell ($c_m$) and ($t_{c1}$) is a color consistency threshold value. In other embodiments, the adjacent cell color intensity consistency process 112 comprises building color histograms for cells and computing distances between them using appropriate metrics, for example Bhattacharya processes; still other appropriate adjacent cell color intensity consistency processes will be apparent to one skilled in the art.

Color correlation may not always be sufficiently determinative of differences between gray-scale regions. Accordingly, the present embodiment substitutes color correlation with relative intensity norms. Thus, even if two cells are only different in gray-scale, the embodiment can differentiate the cells with respect to foreground and background due to different norm values. More particularly, if $f(c_m(c1))$ is big (greater that the color consistency threshold ($t_{c1}$) value), this indicates that the cell is consistent with background and should be eliminated as false positive. In contrast, the values for cells 204 occupied by vehicle images are usually significantly different from those for cells 204 comprising road image data, yielding a relatively smaller $f(c_m(c1))$.

It is noted that positive cells detected/labeled by the color intensity cue process 108/110 do not generally need to verified/validated by the adjacent cell color intensity consistency process at 112, in one aspect because they already have high precision.

Object Block Context.

The positive foreground cell 204 labels generated at 110 and 112 are further validated through an object block context process at 114 that compares the size of blocks formed by connected, contiguous groups of the positively-labeled cells 204 to one or more template filters. If said blocks meet the template criteria, then the positively-labeled cells 204 forming the blocks are each validated as foreground cells; otherwise, they are relabeled or reset to zero or negative values, signifying background cells.

Figure 7:
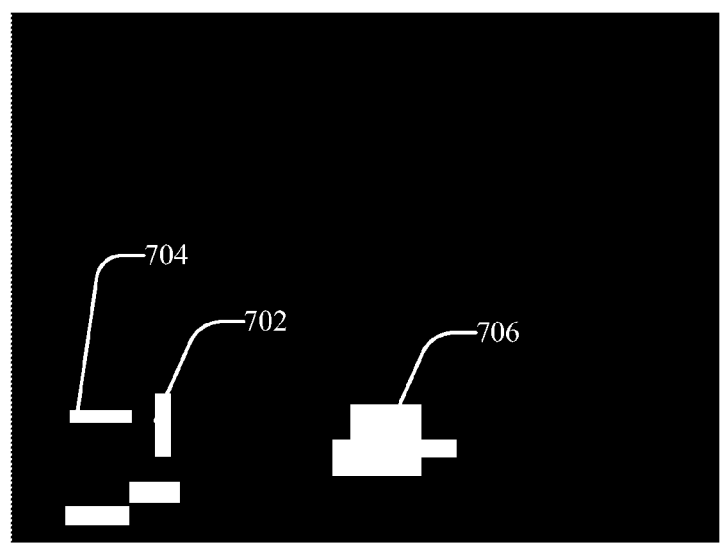
FIG. 7 is a graphic illustration of the region of interest cells of FIG. 5, wherein positively-labeled cells are depicted as solid white squares and negatively-labeled cells are depicted in black.

In the example illustrated in FIG. 7, the pixel values of each positively-labeled cell 204 is set to 255 (depicted as a solid white square), and each negatively-labeled cell 204 is set to zero (and depicted as a solid black square). The cell 204 sizes are selected in embodiments of the present invention to be small enough that each foreground (non-static) vehicle object of interest will span a plurality of adjacent cells in any image frame. Accordingly, each positively-labeled cell 204 should contain a portion of an image of a vehicle object that also spans other contiguous, adjacent positively-labeled cells 204, wherein all of said contiguous cells should together define an object block having a size corresponding to the size of vehicle object depicted therein.

Thus, the object block context process at 114 checks to see if contiguous groups of the positively-labeled cells 204 define blocks that are smaller than predetermined threshold size dimensions of a non-static object of interest. In the example of FIG. 7, if a block formed by neighboring positively-labeled cells 204 has a width or height dimension that is smaller than two cells 204 (for example, blocks 702 and 704, respectively), then all cells 204 in this block are treated as a false positive and relabeled as background (negative/zero). This approach has been found to be very efficient in eliminating false foreground determinations resulting from color differences around roadway lanes.

In contrast, block 706 meets the threshold dimensions (for example, at least two cells 204 high and wide), and therefore each of the cells within the block 706 are validated as true positively-labeled cells 204. At 116 the validated, positively-labeled cells 204 are used to define foreground objects for object analysis.

Implementations of the present embodiment have been found to give robust results in the detection of traffic congestion. One example was tested on two days of video image data captured around Lincoln Center Plaza, in New York city, N.Y., U.S.A. Object determination from said video data showed excellent performance, regardless of the day/night change or raining weather conditions.

In some embodiments, pluralities of different block masks may be provided to verify labels at 114, in some examples selected and applied as a function of scene context. For example, if the process is monitoring a traffic scene region-of-interest that is anticipated to comprise only passenger vehicles (no people or large trucks), then a block having a shape that conforms to the shape of passenger vehicles may be applied (for example, a two cell high by four cell long block), in one aspect reducing false alarms by pedestrians that may occupy two-by-two blocks of cells at a current scene resolution and zoom.

Figure 8:
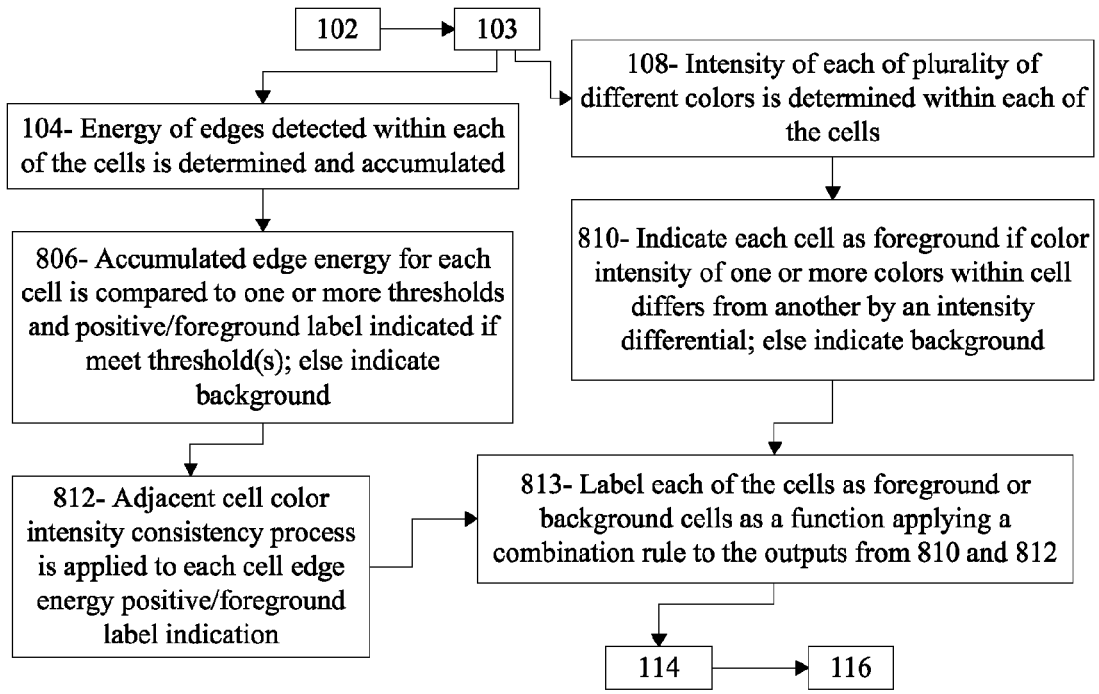
FIG. 8 is a block diagram illustration of another embodiment of a method, process or system according to the present invention for distinguishing and analyzing foreground objects of interest from a background model.

In the embodiment of FIG. 4, labels are determined at each of the edge energy process 104/106/112 and color intensity process 108/110 steps independently, wherein either process may determine that a cell should be labeled as foreground. FIG. 8 illustrates an alternative embodiment according to the present invention wherein such processes are combined to make a foreground cell determination using some of the steps and processes of FIG. 4. More particularly, the energy of edges detected within each of the cells that is determined and accumulated through one or more processes at 104 is used as an input at 806 and compared to one or more edge energy thresholds and a positive/foreground label indicated accordingly (which may comprise combining a plurality of accumulated value outputs at 104 that each meet an edge energy threshold in a logical OR decision process, wherein any indicates a positive label; or requiring threshold multiples to indicate the label; or all of a plurality of different processes in a logical AND decision process). An edge energy foreground indication output is accordingly generated for each of the cells at 806 that indicates foreground if the accumulated edge energy meets the edge energy threshold, or indicates background if it does not meet the edge energy threshold. The resultant edge-energy foreground label indications for each cell output from 806 are then verified at 812 in an adjacent cell color intensity consistency process.

The intensities of different colors determined within each of the cells through one or more processes at 108 are compared within each cell at 810. As discussed generally with respect to FIG. 4, a color intensity foreground indication output is generated accordingly at 810 that indicates foreground if one of the determined color intensities is greater than another of the determined color intensities for that cell by a color intensity differential threshold; else the color intensity foreground indication output indicates that the cell is background.

The label indication outputs from the edge energy/validation process 812 and the color intensity process 810 are received into a complex decision function at 813. The decision function labels each of the cells as foreground or background at 813 in response to the color intensity foreground indication output and the color intensity foreground indication output for each cell as a function of a foreground indication output combination rule.

A variety of foreground indication output combination rules may be practiced at 813. For example, the rule may tally foreground indications for each cell and label as foreground if threshold numbers of foreground indications are received as inputs, such as two or more if three or more processes provide inputs from 810 and 812. A foreground label may be determined at 813 if any of the inputs from 810 and 812 indicate foreground in a "logical OR" rule. Alternatively, the rule applied at 813 may require that all of the inputs from 810 and 812 agree on a foreground label in a logical AND decision process, with failure of any one input resulting in a default background label. (It will also be understood that presumptions may default to foreground labels instead of background, and the user may freely design the embodiment to err toward either determination as needed.) Certain process outputs generated at 810 or 812 may be differently weighted: for example, if the respective outputs do not agree on foreground or background, then the indication from a more heavily-weighted one of the two processes 810 and 812 may be used to define the label at 813.

Embodiments of the present invention provide a number of benefits over adaptive background modeling and learning based object detectors taught by the prior art. They are more robust to sudden illumination variation caused by scene changes such as noisy light, or shadow created by moving cloud. They are more efficient at detecting both static and moving objects, as moving object determinations are not dependent on motion information. They do not suffer from the healing problems experienced by prior art background subtraction models. They do not need to solve occlusion and multiple views problems, as is required in prior art learning-based object detector frameworks. In fact, no training process is needed, the embodiment implementations may be completely unsupervised. Moreover, there are no over-fitting problems, which may occur in learning-based algorithms.

Transportation optimization is useful in identifying bottlenecks of a transportation system in a given domain (city, county, university campus or any other organizational entity defining the scope of a transit system). By monitoring a degree of congestion of each of a plurality of roads, embodiments of the present invention may optimize management of vehicular traffic handled by a transportation system, for example to indicate the need and location of the construction of a new overpass in a heavy congestion area, or to trigger applying increased, decreased or differentiated user fees (tolls, toll road designations, mass transit fares, etc.) in order to reduce traffic congestion on a given roadway. Embodiments may also be used to determine and provide information given to roadway users to directly relieve congestion in real-time, for example to inform drivers of alternate routing in response to determining present heavy traffic on a current route.

Figure 9:
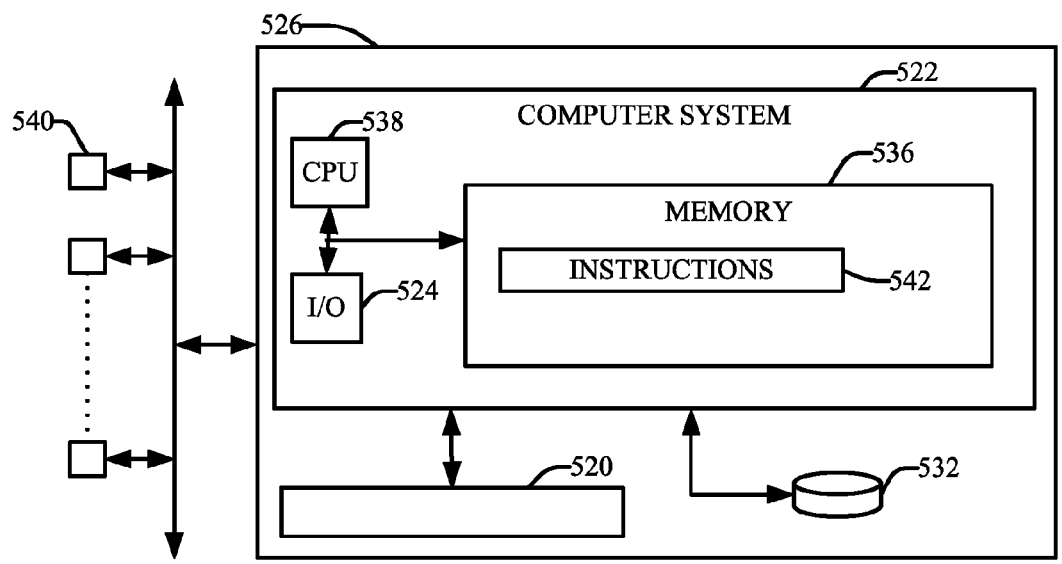
FIG. 9 is a block diagram illustration of a computerized implementation of an embodiment of the present invention.

Referring now to FIG. 9, an exemplary computerized implementation of an embodiment of the present invention includes a computer system or other programmable device 522 in communication with region-of-interest video data sources 540 (cameras, archived video data from storage units, etc.) that provide the video data processed according to the embodiments of FIG. 4 or 8. Instructions 542 reside within computer readable code in a computer readable memory 536, or in a computer readable storage system 532, input output (I/O) device 524 or other tangible computer readable storage medium that is accessed through a computer network infrastructure 526 by a processing unit (CPU) 538. Thus, the instructions, when implemented by the processing unit (CPU) 538, cause the processing unit (CPU) 538 to use multiple cues including edge energy and color intensity analysis to distinguish foreground objects of interest as described above with respect to FIG. 4 or 8.

Embodiments of the present invention may also perform process steps of the invention on a subscription, advertising, and/or fee basis. That is, a service provider could offer to integrate computer-readable program code into the computer system 522 to enable the computer system 522 to use multiple cues including edge energy and color intensity analysis to distinguish foreground objects of interest as described above with respect to the embodiments of FIG. 4 or 8. The service provider can create, maintain, and support, etc., a computer infrastructure such as the computer system 522, network environment 526, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computer device 522, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for distinguishing foreground objects of interest from a background model, the method comprising:

dividing by a programmable device a region of interest of a video data image into a grid array of a plurality of individual cells, wherein each of the cells has a two-dimensional area dimension that is smaller than a two-dimensional area size of a foreground object of interest so that image data of the foreground object in an image data frame spans a contiguous plurality of the cells;

initializing each of the cells with a background label;

acquiring by the programmable device frame image data for each of the cells;

detecting and accumulating by the programmable device energy of edges within each of the cells, and relabeling as foreground each of the cells initialized with the background label that have an accumulated edge energy that meets an edge energy threshold;

determining by the programmable device color intensities for each of a plurality of different colors within each cell, and relabeling as foreground each of the cells initialized with the background label that have one of the determined color intensities greater than another of the determined color intensities for that cell by a color intensity differential threshold; and using by the programmable device the frame image data from the cells relabeled as foreground to define a foreground object.

2. The method of claim 1, further comprising:

for each of the cells that are relabeled as foreground by the programmable device in response to having accumulated edge energy that meets the edge energy threshold, the programmable device:

summing the different color intensities determined for the cell to generate a color intensity sum of said relabeled cell;

comparing the generated color intensity sum of said relabeled cell to sums of the color intensities determined for each of a plurality of cells that are adjacent to said relabeled cell; and revising the label of said relabeled cell to the background label in response to determining that the generated color intensity sum of said relabeled cell is greater than the compared sums of the color intensities determined for each of plurality of cells that are adjacent to said relabeled cell by a color consistency threshold, wherein the revising the label is performed prior to the step of the programmable device using the frame image data from the cells relabeled as foreground to define the foreground object.

3. The method of claim 2, further comprising the programmable device:

comparing the size of blocks formed by contiguous groups of the relabeled foreground cells to a template filter; and revising the labels of each of the relabeled foreground cells of the contiguous group of blocks that do not fit the compared template filter, wherein the revising the labels is performed prior to the step of the programmable device using the frame image data from the cells relabeled as foreground to define the foreground object.

4. The method of claim 3, wherein the template has a height and a width, and the programmable device revises the label of each of the relabeled foreground cells of the ones of the contiguous group of blocks in response to determining that a height of the contiguous group of blocks is less than the template height, or in response to determining that a width of the contiguous group of blocks is less than the template width.

5. The method of claim 3, wherein the programmable device is a computer system comprising a processing unit, a computer readable memory and a computer readable hardware storage device, the method further comprising:
   integrating computer-readable program code into the computer system, wherein the computer readable program code is embodied on the computer readable hardware storage device and comprises instructions that, when executed by the processing unit via the computer readable memory, cause the processing unit to perform the steps of:
   dividing the region of interest into the grid array;
   initializing each of the cells with the background label;
   acquiring the frame image data for each of the cells;
   detecting and accumulating the energy of edges within each of the cells, and relabeling as foreground each of the cells initialized with the background label that have the accumulated edge energy that meets the edge energy threshold;
   determining the device color intensities for each of the plurality of different colors within each cell, and relabeling as foreground each of the cells initialized with the background label that have the one color intensities determined greater than another of the determined color intensities for that cell by the color intensity differential threshold; and
   using the frame image data from the cells relabeled as foreground to define the foreground object.

6. The method of claim 3, wherein the step of the programmable device detecting and accumulating the energy of edges within each of the cells, and relabeling as foreground each of the cells initialized with the background label that have the accumulated edge energy that meets the edge energy threshold, further comprises:
   applying a Sobel operator to each cell to create an edge patch; and
   determining the label of the each cell as "1" to signify foreground and "0" to signify background according to:

$$f_e(c_m) = \begin{cases} 1 & \sum_{i=1}^{N} E(x_i) > t_e \\ 0 & \sum_{i=1}^{N} E(x_i) \le t_e; \end{cases}$$

wherein $c_m$ is an $m^{th}$ cell of the cells, $E(x_i)$ is an energy of the edge patch at pixel $x_i$ of an "N" plurality of pixels "i" of the cell $c_m$, and cell $c_m$ is relabeled as "1" to signify foreground in response to determining that the summation of edge energy of the N pixels of the cell $c_m$ is bigger than an edge energy threshold $t_e$.

7. The method of claim 3, wherein the different colors of the determined color intensities are one of red, relative green and blue color channels.

8. The method of claim 7, wherein the programmable device determines the color intensities for each of the different colors within each cell of the cells, and re-labels each of the cells according to:

$$f_c(c_m) = \begin{cases} 0 & \frac{\min(D_{rg}, D_{rb}, D_{gb})}{\max(D_{rg}, D_{rb}, D_{gb})} > t_c \\ 1 & \frac{\min(D_{rg}, D_{rb}, D_{gb})}{\max(D_{rg}, D_{rb}, D_{gb})} \le t_c \end{cases}$$

wherein c is an $m^{th}$ cell of the cells, $D_{rg}$ is determined as equal to "$\Sigma_{i=1}^{N}|d_{rg,i}|$", $d_{rg,i}$ is an intensity difference between the red channel and the relative green channel for each pixel "i" of "N" pixels of the cell $c_m$, $D_{rb}$ is determined as equal to "$\Sigma_{i=1}^{N}|d_{rb,i}|$", $d_{rb,i}$ is an intensity difference between the red channel and the blue channel for each of the "N" pixels "i" of the cell $c_m$, $D_{gb}$ is determined as equal to "$\Sigma_{i=1}^{N}|d_{gb,i}|$", $d_{gb,i}$ is an intensity difference between the relative green channel and the blue channel for each of the "N" pixels "i" of the cell $c_m$, cell $c_m$ is relabeled as "1" to signify foreground in response to determining that a value of "min($D_{rg}$,$D_{rb}$,$D_{gb}$)" divided by "max($D_{rg}$,$D_{rb}$,$D_{gb}$)" is less than or equal to a color intensity differential threshold "$t_c$", and cell $c_m$ is relabeled as "0" to signify background in response to determining that a value of "min($D_{rg}$,$D_{rb}$,$D_{gb}$)" divided by "max($D_{rg}$,$D_{rb}$,$D_{gb}$)" is greater than the color intensity differential threshold "$t_c$".

9. The method of claim 8, wherein the programmable device re-labels each of the cells according to:

$$f_{c1}(c_m) = \begin{cases} 0 & \frac{\min(\|V_{rgb}\|, \{\|V'^1_{rgb}\| \ldots \|V'^K_{rgb}\|\})}{\max(\|V_{rgb}\|, \{\|V'^1_{rgb}\| \ldots \|V'^K_{rgb}\|\})} > t_{c1} \\ 1 & \frac{\min(\|V_{rgb}\|, \{\|V'^1_{rgb}\| \ldots \|V'^K_{rgb}\|\})}{\max(\|V_{rgb}\|, \{\|V'^1_{rgb}\| \ldots \|V'^K_{rgb}\|\})} \le t_{c1} \end{cases}$$

wherein $V_{rgb}$ is determined as equal to the expression "($\upsilon_1, \upsilon_2, \upsilon_3$)" and is a summation of intensity values for each of the individual red, relative green and blue color channels, $\{\|V'_{rgb}^1\| \ldots V'_{rgb}^K\|\}$ is related to a set of "K" adjacent cells, cell $c_m$ is relabeled as "0" to signify background in response to determining that a value of "min($\|V_{rgb}\|,\{\|V'_{rgb}^1\| \ldots V'_{rgb}^K\|\}$) divided by "max($\|V_{rgb}\|, \{\|V'_{rgb}^1\| \ldots V'_{rgb}^K\|\}$)" is greater than a color consistency threshold value ($t_{c1}$), and cell $c_m$ is relabeled as "1" to signify foreground in response to determining that a value of "min($\|V_{rgb}\|,\{\|V'_{rgb}^1\| \ldots V'_{rgb}^K\|\}$)" divided by "max($\|V_{rgb}\|,\{\|V'_{rgb}^1\| \ldots V'_{rgb}^K\|\}$)" is less than or equal to the color consistency threshold value ($t_{c1}$).

10. A method for distinguishing foreground objects of interest from a background model, the method comprising:
   dividing by a programmable device a region of interest of a video data image into a grid array of a plurality of individual cells, wherein each of the cells has a two-dimensional area dimension that is smaller than a two-dimensional area size of a foreground object of interest so that image data of the foreground object in an image data frame spans a contiguous plurality of the cells;
   acquiring by the programmable device frame image data for each of the cells;

detecting and accumulating by the programmable device energy of edges within each of the cells, generating an edge energy foreground indication output for each of the cells that indicates foreground in response to determining that an accumulated edge energy meets an edge energy threshold, or indicates background in response to determining that the accumulated edge energy does not meet the edge energy threshold;

determining by the programmable device color intensities for each of a plurality of different colors within each of the cells, and generating a color intensity foreground indication output for each of the cells that indicates foreground in response to determining that one of the determined color intensities is greater than another of the determined color intensities for that cell by a color intensity differential threshold, or indicates background in response to determining that no one of the determined color intensities is greater than any other one of the determined color intensities for that cell by the color intensity differential threshold;

labeling each of the cells as foreground or background in response to the edge energy foreground indication output and the color intensity foreground indication output for the each cell as a function of a foreground indication output combination rule; and using by the programmable device the frame image data from the cells labeled as foreground cells to define a foreground object.

11. The method of claim 10, wherein the foreground indication output combination rule requires both of the color intensity foreground indication output and the edge energy foreground indication output to indicate foreground to label the cell as foreground, and wherein the step of labeling by the programmable device each of the cells as foreground or background comprises:

applying a logical AND operation to inputs of the edge energy foreground indication output and the color intensity foreground indication output that generates a true output for each one of the cells in response to determining that both of the inputs indicate that the cell is foreground; and labeling each of the cells having generated true outputs as foreground cells.

12. The method of claim 11, further comprising:

for each of the cells that are indicated as foreground in response to having accumulated edge energy that meets the edge energy threshold, the programmable device:

summing the different determined color intensities to generate a color intensity sum;

comparing the generated color intensity sum to sums of the color intensities determined for each of a plurality of cells that are adjacent to said cell having the generated color intensity sum; and revising the color intensity foreground indication output for said cell having the generated color intensity sum to indicate background in response to determining that said generated color intensity sum is greater than the compared sums of the color intensities determined for each of the plurality of adjacent cells by a color consistency threshold, wherein the revising the foreground indication output is performed prior to the step of labeling said cells as foreground or background as the function of the foreground indication output combination rule.

13. The method of claim 12, further comprising the programmable device:

comparing the size of blocks formed by contiguous groups of the labeled foreground cells to a template filter; and revising the labels of each of the cells in the contiguous group of blocks that do not fit the compared template filter to background, wherein the revising the labels is performed prior to the step of the programmable device using the frame image data from the cells labeled as foreground to define the foreground object.

14. The method of claim 13, wherein the template has a height and a width, and the programmable device revises the label of each of the labeled foreground cells of the contiguous group of blocks in response to determining that a height of the contiguous group of blocks is less than the template height, or in response to determining that a width of the contiguous group of blocks is less than the template width.

15. The method of claim 10, wherein the programmable device is a computer system comprising a processing unit, a computer readable memory and a computer readable hardware storage device, the method further comprising:

integrating computer-readable program code into the computer system, wherein the computer readable program code is embodied on the computer readable hardware storage device and comprises instructions that, when executed by the processing unit via the computer readable memory, cause the processing unit to perform the steps of:

dividing the region of interest of the video data image into the grid array of individual cells;

acquiring the frame image data for each of the cells;

detecting and accumulating the energy of edges within each of the cells, and generating the edge energy foreground indication output for each of the cells that indicates foreground in response to the accumulated edge energy meeting the edge energy threshold, or indicates background in response to the accumulated edge energy not meeting the edge energy threshold;

determining the color intensities for each of the different colors within each of the cells, and generating the color intensity foreground indication output for each of the cells that indicates foreground in response to determining that the determined one color intensity is greater than another of the determined color intensities for that cell by the color intensity differential threshold, or indicates background in response to determining that no one of the determined color intensities is greater than any other one of the determined color intensities for that cell by the color intensity differential threshold;

labeling each of the cells as foreground or background in response to the edge energy foreground indication output and the color intensity foreground indication output for the each cell as a function of the foreground indication output combination rule; and using the frame image data from the cells labeled as foreground cells to define a foreground object.

16. A system, comprising:

a processing unit in communication with a computer readable memory and a computer-readable hardware storage device;

wherein the processing unit, when executing program instructions stored on the computer-readable hardware storage device via the computer readable memory:

divides a region of interest of a video data image into a grid array of a plurality of individual cells, wherein each of the cells has a two-dimensional area dimension that is smaller than a two-dimensional area size of a foreground object of interest so that image data of the foreground object in an image data frame spans a contiguous plurality of the cells;

initializes each of the cells with a background label;
acquires device frame image data for each of the cells;
detects and accumulates energy of edges within each of the cells, and re-labels as foreground each of the cells initialized with the background label that have an accumulated edge energy that meets an edge energy threshold;
determines color intensities for each of a plurality of different colors within each cell, and re-labels as foreground each of the cells initialized with the background label that have one of the determined color intensities greater than another of the determined color intensities for that cell by a color intensity differential threshold; and
uses the frame image data from the cells relabeled as foreground to define a foreground object.

17. The system of claim 16, wherein the processing unit, when executing the program instructions stored on the computer-readable hardware storage device via the computer readable memory, for each of the cells that are relabeled as foreground in response to having accumulated edge energy that meets the edge energy threshold, further:
sums the different color intensities determined for the cell to generate a color intensity sum of said relabeled cell;
compares the generated color intensity sum of said relabeled cell to sums of the color intensities determined for each of a plurality of cells that are adjacent to said relabeled cell; and
revises the label of said relabeled cell to the background label in response to determining that the generated color intensity sum of said relabeled cell is greater than the compared sums of the color intensities determined for each of a plurality of cells that are adjacent to said relabeled cell by a color consistency threshold, wherein the label is revised prior to using the frame image data from the cells relabeled as foreground to define the foreground object.

18. The system of claim 17, wherein the processing unit, when executing the program instructions stored on the computer-readable hardware storage device via the computer readable memory, further:
compares the size of blocks formed by contiguous groups of the relabeled foreground cells to a template filter; and
revises the labels of each of the relabeled foreground cells of the contiguous group of blocks that do not fit the compared template filter, wherein the labels are revised prior to using the frame image data from the cells relabeled as foreground to define the foreground object.

19. The system of claim 18, wherein the template has a height and a width, and wherein the processing unit, when executing the program instructions stored on the computer-readable hardware storage device via the computer readable memory, further revises the label of each of the relabeled foreground cells of the ones of the contiguous group of blocks in response to determining that a height of the contiguous group of blocks is less than the template height, or in response to determining that a width of the contiguous group of blocks is less than the template width.

20. The system of claim 19, wherein the template height is at least the height of two of the cells, and the template width is at least the width of two of the cells.

21. An article of manufacture, comprising:
a computer readable hardware storage device having computer readable program code embodied therewith, the computer readable program code comprising instructions that, when executed by a computer processing unit, cause the computer processing unit to:
divide a region of interest of a video data image into a grid array of a plurality of individual cells, wherein each of the cells has a two-dimensional area dimension that is smaller than a two-dimensional area size of a foreground object of interest so that image data of the foreground object in an image data frame spans a contiguous plurality of the cells;
acquire frame image data for each of the cells;
detect and accumulate energy of edges within each of the cells, and generate an edge energy foreground indication output for each of the cells that indicates foreground in response to determining that an accumulated edge energy meets an edge energy threshold, or indicates background in response to determining that the accumulated edge energy does not meet the edge energy threshold;
determine color intensities for each of a plurality of different colors within each of the cells, and generate a color intensity foreground indication output for each of the cells that indicates foreground in response to determining that one of the determined color intensities is greater than another of the determined color intensities for that cell by a color intensity differential threshold, or indicates background in response to determining that no one of the determined color intensities is greater than any other one of the determined color intensities for that cell by the color intensity differential threshold;
label each of the cells as foreground or background in response to the edge energy foreground indication output and the color intensity foreground indication output for the each cell as a function of a foreground indication output combination rule; and
use the frame image data from the cells labeled as foreground cells to define a foreground object.

22. The article of manufacture of claim 21, wherein the foreground indication output combination rule requires both of the color intensity foreground indication output and the edge energy foreground indication output to indicate foreground to label the cell as foreground, and wherein the computer readable program code instructions, when executed by the computer processing unit, further cause the computer processing unit to label each of the cells as foreground or background by:
applying a logical AND operation to inputs of the edge energy foreground indication output and the color intensity foreground indication output that generates a true output for each one of the cells in response to determining that both of the inputs indicate that the cell is foreground; and
labeling each of the cells having generated true outputs as the foreground cells.

23. The article of manufacture of claim 22, wherein the computer readable program code instructions, when executed by the computer processing unit, further cause the computer processing unit to, for each of the cells that are indicated as foreground in response to having accumulated edge energy that meets the edge energy threshold:
sum the different determined color intensities to generate a color intensity sum;
compare the generated color intensity sum to sums of the color intensities determined for each of a plurality of cells that are adjacent to said cell having the generated color intensity sum; and
revise the color intensity foreground indication output for said cell having the generated color intensity sum to indicate background in response to determining that said generated color intensity sum is greater than the compared sums of the color intensities determined for each of the plurality of adjacent cells by a color consistency threshold, wherein the foreground indication output is revised prior to labeling of said cells as foreground or background as the function of the foreground indication output combination rule.

24. The article of manufacture of claim 23, wherein the computer readable program code instructions, when executed by the computer processing unit, further cause the computer processing unit to:
   compare the size of blocks formed by contiguous groups of the labeled foreground cells to a template filter; and
   revise the labels of each of the cells in the contiguous group of blocks that do not fit the compared template filter to background labels, wherein the labels are revised prior to using the frame image data from the cells labeled as foreground to define the foreground object.

25. The article of manufacture of claim 24, wherein the template has a height and a width, and wherein the computer readable program code instructions, when executed by the computer processing unit, further cause the computer processing unit to revise the label of each of the labeled foreground cells of the contiguous group of blocks in response to determining that a height of the contiguous group of blocks is less than the template height, or in response to determining that a width of the contiguous group of blocks is less than the template width.

* * * * *